United States Patent [19]

Smith et al.

[11] Patent Number: 5,135,810
[45] Date of Patent: Aug. 4, 1992

[54] METHOD OF MACHINING AND STRUCTURE OF MACHINED PINION GEAR

[75] Inventors: Roland C. Smith, Milford; James S. Fisher, Auburn, both of Ind.

[73] Assignee: Dana Corporation, Toledo, Ohio

[21] Appl. No.: 667,792

[22] Filed: Mar. 11, 1991

[51] Int. Cl.$^5$ .............................................. B21H 3/00
[52] U.S. Cl. ................................. 428/579; 428/582; 29/893.31; 403/13; 403/334; 403/383
[58] Field of Search ............. 29/893.3, 893.31; 82/150, 165, 166; 403/13, 14, 121, 333, 334, 383; 428/579, 582, 586; 74/417

[56] References Cited

U.S. PATENT DOCUMENTS

| | | | |
|---|---|---|---|
| 527,064 | 10/1894 | Johnson | 82/150 |
| 1,285,350 | 11/1918 | Palmgren | 82/150 |
| 1,710,526 | 4/1929 | Witherow | 29/893.36 |
| 3,429,172 | 2/1969 | Lierse et al. | 72/344 |
| 4,050,283 | 9/1977 | Schober | 72/344 |
| 4,075,915 | 2/1978 | Williams | 82/150 |

FOREIGN PATENT DOCUMENTS 125703 6/1986 Japan ........................ 82/150

*Primary Examiner*—P. W. Echols
*Attorney, Agent, or Firm*—Dykema Gossett

[57] ABSTRACT

A method for machining a part with gear teeth onto an unmachined part to form drive pinion gears is disclosed. A center bore is formed at one end of the part and receives a tool center to mount the part for machining. The center bore includes a plurality of lobes which are in point contact with the lathe center, allowing adjustment between the unmachined part and the lathe center. Drive apertures are formed radially outwardly of this center bore to receive drive pins from the machine tool. Most preferably the drive apertures are slots which provide clearance, facilitating the alignment of the drive pins in the drive apertures.

13 Claims, 1 Drawing Sheet

METHOD OF MACHINING AND STRUCTURE OF MACHINED PINION GEAR

BACKGROUND OF THE INVENTION

This invention in general relates to a method of machining a part. More particularly, the invention relates to a method of machining a drive pinion gear, and the structure of that gear.

Various parts are initially forged in an unmachined configuration, and subsequently machined. A forged part may receive a heat treatment stage subsequent to forging. Unmachined parts may be forged with a conical center bore to receive a tool center for mounting the part during machining. Drive holes may be machined into one end of the part to receive drive pins from a machining tool, such as a lathe, to assist in rotating the part during machining. Such parts may be difficult to machine since the conical center bore may not be true, and thus may not properly mount the part on the lathe center. Further, the drive holes formed adjacent to the lathe centers can cause the center to distort during heat treatment. The presence of the drive hole apertures, which are typically formed at two points spaced radially outwardly from the conical center bore, may cause distortion in the configuration of the conical center bore during heat treatment. The part may not be properly mounted on the tool center and may be misaligned or wobble during machining.

When the conical center bore is distorted it is more difficult to properly machine the part. This is especially a problem in a part with gear teeth machined at the outer periphery. The gear teeth must be precisely machined, and thus the blank, which is the part to be machined to have gear teeth, must be properly mounted on the lathe center during machining.

Further, the machining of drive holes adds additional steps to the manufacturing process. It is desirable to reduce the number of such steps. Another problem with prior art part machining relates to the shape of the known drive holes. These drive holes are typically cylindrical in cross-section and approximately equal to the cross-section of the drive pins. This may result in difficulty in aligning the drive holes with the drive pines.

Prior art unmachined parts are known which include a tri-lobed center for mounting on a lathe center. In particular, such structure may have been used to process a part with unmachined centers in preparation for cutting gear teeth on a drive pinion gear. This tri-lobed center contacts the lathe center over less than 360° of its outer periphery, and is formed at one end of the part. Such a part can adjust on the lathe center for any misalignment. These prior art structures have not been used in combination with drive holes, and thus are not directed to solve the problems discussed above.

SUMMARY OF THE INVENTION

In a disclosed method according to the present invention, a center bore for receiving a lathe center is formed on one face of an unmachined part, wherein the center bore contacts the lathe center bore over less than 360°. More preferably, the center is formed with three lobes which contact the lathe center and allow the unmachined part to adjust relative to the lathe center. Even more preferably, each of these lobes are essentially in line contact with the lathe center such that the part can easily adjust on the lathe center. The parts are formed with drive apertures on the one face to receive drive pins from the lathe.

More preferably, the unmachined part is initially forged with the center bore structure, and may also be forged with the drive apertures. The forged unmachined part is then heat treated. This heat treatment may cause some distortion in the center bore due to the presence of the drive apertures, but the tri-lobed center bore allows the unmachined part to adjust for this distortion on the lathe center.

Each drive aperture is preferably formed as a slot which extends through a greater length along a direction radially outwardly from the part center than it does in a dimension extending tangent to a radius from the part center. This provides a clearance such that the drive pin may be easily aligned with the drive aperture. The drive pins are still closely guided in the tangent direction through which they transmit rotation.

In a most preferred embodiment of the present invention, an unmachined part is machined to have gear teeth at an outer periphery, and is then used as a drive pinion gear. The use of the unique mounting structure for mounting the unmachined part on the lathe ensures that this complex part is accurately machined, and that the final gear structure is as desired. The method according to this invention reduces the complexity of manufacturing steps in forming such a part, and also improves the accuracy of the finished part.

A part according to the present invention includes a center bore at one end with the tri-lobed center bore, and at least one drive aperture spaced radially outwardly of the center bore. Most preferably, this part has drive slots as described above.

These and other features of the present invention will be best understood from the following specification and drawings, of which the following is a brief description.

DETAILED DESCRIPTION OF A PREFERRED EMBODIMENT

Figure 1:
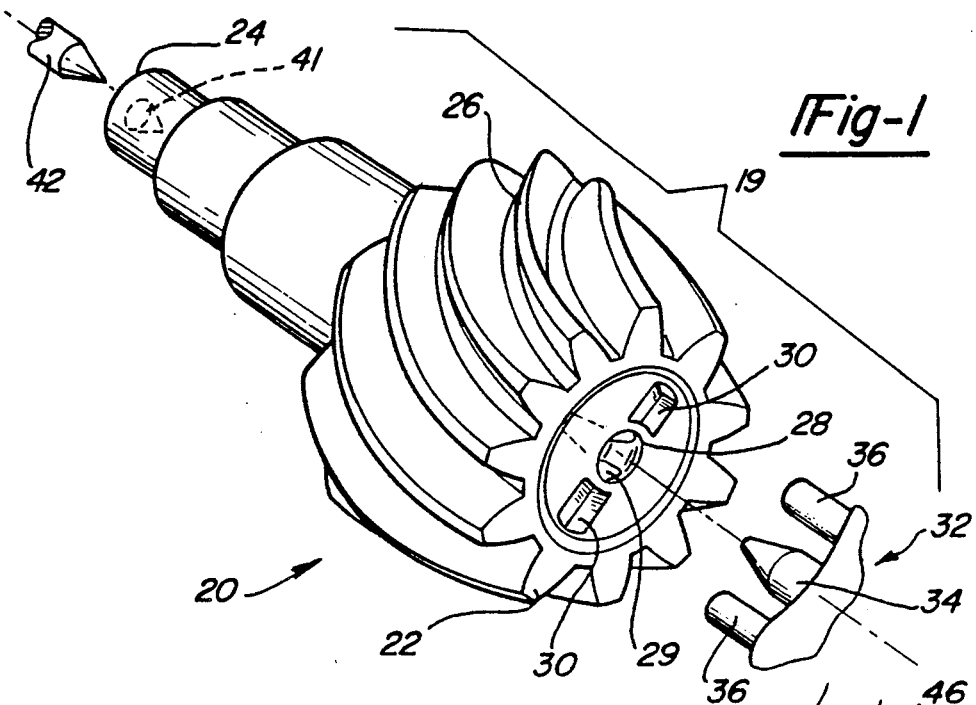
FIG. 1 is a perspective view of an assembly for machining a part according to the present invention.

An assembly 19 for machining part 20 according to the present invention is illustrated in FIG. 1. Part 20 has front end 22, rear end 24, and may be a drive pinion gear having gear teeth 26 at the outer periphery of front end 22. Center bore 28 includes lobes 29, three of which are preferably used. Drive apertures 30, which may be slots, are spaced radially outwardly of center bore 28. Drive slots 30 extend for a greater dimension radially outwardly from a center of front end 22 than they do for a dimension generally tangent to a radius from the center. As will be explained below, this provides a clearance facilitating the insertion of a drive pin into drive slot 30.

A portion of machine tool 32, which may be a lathe, has center 34 and a pair of drive pins 36. Center 34 is received in center bore 28 and drive pins 36 are received in slots 30. Further, a center bore 41 is formed at rear end 24 to receive rear spindle member 42 to fully support part 20 on machine tool 32.

Figure 2:
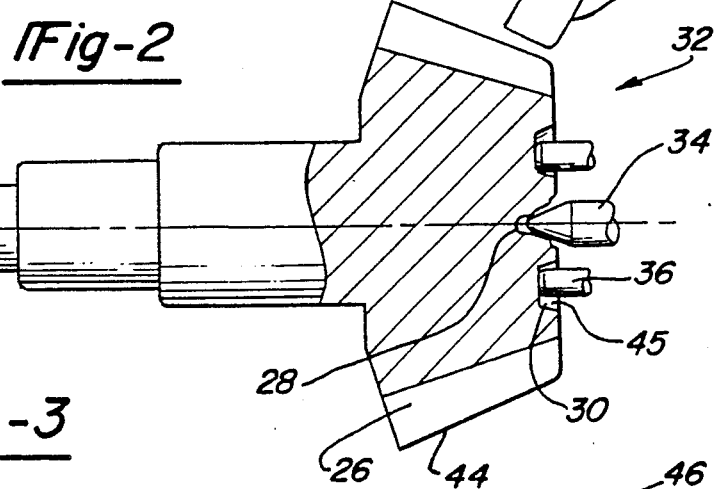
FIG. 2 is a cross-sectional view through the part mounted to a lathe.

FIG. 2 is a cross-sectional view of part 20 mounted to machine tool 32. Center 34 is received in center bore 28 and a pair of opposed drive pins 36 are received in drive slots 30, with clearance 45. This clearance facilitates the alignment of the drive pins in the drive slots. Rear end 24 of part 20 includes rear center bore 41 which receives rear spindle 42 from machine tool 32. Part 20 is rotated by pins 36 and the outer periphery 44 of part 20 is machined by tool 43 shown schematically, to include gear teeth 26. The gear teeth are shown schematically in FIG. 2 to simplify the drawing.

Figure 3:
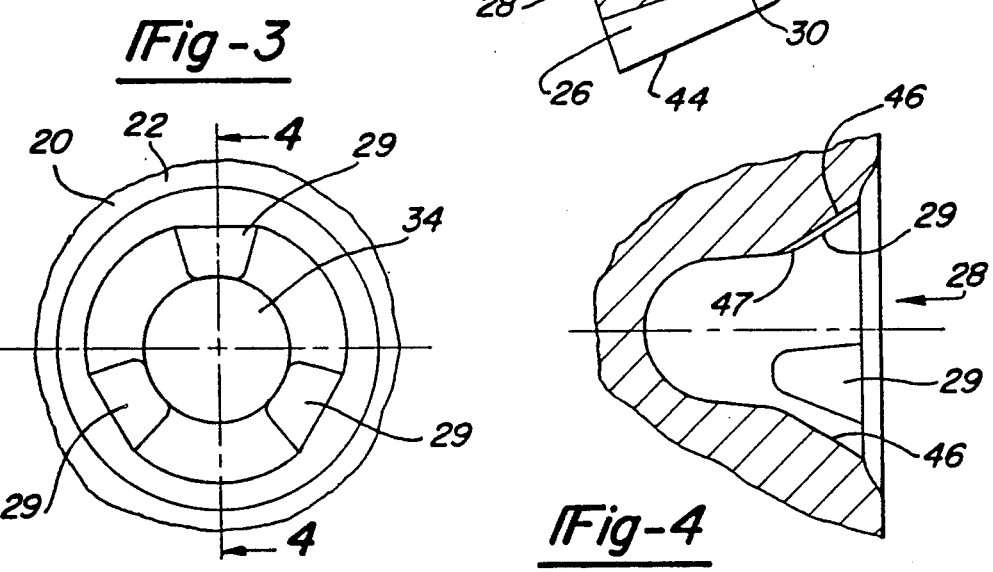
FIG. 3 is an end view of the part mounted to the lathe as shown in FIG. 2.

FIG. 3 shows front end 22 of part 20 when it is mounted on the machine tool. Lobes 29 contact center 34. Since lobes 29 only contact center 34 at three points, part 20 can adjust on center 34 for any distortion in the formation of lobes 29, or the rear center bore.

Figure 4:
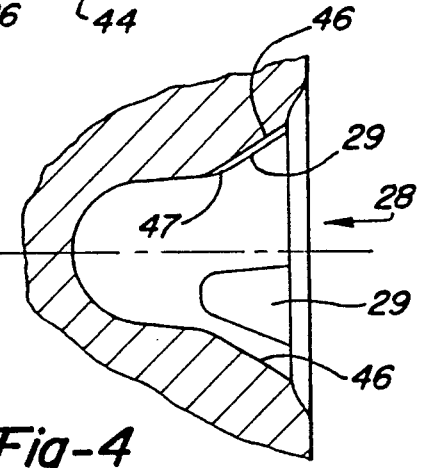
FIG. 4 is a cross-sectional view along line 4—4 as shown in FIG. 3.

As shown in FIG. 4, each lobe 29 is a flat planar surface in the otherwise conical inner peripheral surface 46 of center bore 28. The flats create inner contact lines 47 spaced inwardly from an inner periphery surface 46. Thus, each lobe 29 is essentially in line contact with center 34. It may be desirable to shape the lobes such that there is point contact. Drive can be transmitted through the drive pins, and part 20 is adjustable on the tool center for any misalignment caused by the shape of either aperture 28, or the rear center bore which may also be tri-lobed in nature.

Part 20 is preferably forged with center bore 28 and drive slots 30. The forged unmachined part 20 may then be heat treated. After this heat treatment, unmachined part 20 is machined.

The material for forming unmachined part 20 is selected according to its final use. In one drive pinion gear embodiment, SAE 8620 steel was utilized. The part was initially forged and then subject to a known heat treatment process. The particular heat treatment process was an isothermic atmospheric annealing process. In such processes, a part is raised above a critical temperature and held at that temperature for a period of time. The part is then quick-cooled below the critical temperature in a protected atmosphere. In the particular method, the protected atmosphere was a cracked natural gas atmosphere. The part is then exposed to ambient air.

Although this invention has been disclosed for forming a drive pinion gear, it should be understood that the basic method steps and structure of the part may provide benefits to the machining of any part. Further, although drive slots are illustrated, the teachings of this invention would also have benefits for any shape drive aperture.

Although a preferred embodiment has been disclosed, one of ordinary skill in the art would recognize that certain modifications would come within the scope of this invention. For this reason the following claims should be studied in order to determine the true scope and content of this invention.

We claim:

1. A method of forming a part by machining comprising the steps of:
   (a) forming an unmachined part that is centered on an axis and has two axial ends, by providing at least at one end a first aperture generally centered on said axis and a pair of drive apertures spaced radially outwardly of said first aperture, said drive apertures being spaced by 180° about said center axis from each other, each of said drive apertures having a first dimension measured radially outwardly from said center axis which is greater than a second dimension measured tangent to a radius from said center axis, and providing said first aperture with a plurality of first inner periphery portions which are radially spaced from said axis by a first distance at a first axial position, and second inner periphery portions radially spaced from said axis by a distance greater than said first distance at said first axial position, such that said first periphery portions do not extend over the full 360° of said first aperture;
   (b) mounting said unmachined part to a machine tool with drive pins received in said drive apertures, said drive pins being of a dimension less than said second dimension such that a clearance is provided in said drive apertures in a radially outward direction, and a tool center received in said first aperture such that said first inner periphery portions of said first aperture do not contact the tool center over the full 360° of its outer periphery;
   (c) rotating the unmachined part relative to the machine tool about the axis; and
   (d) machining the unmachined part to form a finished part.

2. A method as recited in claim 1, wherein the lobes are shaped such that they are in line contact with the tool center.

3. A method as recited in claim 2, wherein there are three such lobes.

4. The method as recited in claim 3, wherein the mounting of the unmachined part as recited in step (b) includes positioning a tool support member in a rear aperture at the other axial end of the unmachined part.

5. A method as recited in claim 4, wherein the machining step includes cutting of gear teeth into the outer periphery of the unmachined part.

6. A method as recited in claim 1, wherein the innermost periphery of the first aperture results in line contact between the first aperture and the tool center.

7. A method as recited in claim 1, wherein the machining of the part as recited in step (d) includes cutting gear teeth into the outer periphery of the unmachined part.

8. The method as recited in claim 1, wherein forming the unmachined part as recited in step (a) includes forging the part.

9. The method as recited in claim 8, wherein the first aperture is formed in the part during the forging step.

10. The method as recited in claim 9, wherein the drive aperture is also formed in the part during the forging step.

11. The method as recited in claim 10, wherein the part is heat treated, between steps (a) and (b).

12. The method as recited in claim 1, wherein the part is heat treated between steps (a) and (b).

13. A part comprising:
    a center axis and two axis ends, with at least one end having a center aperture with an inner peripheral surface including at least three discrete lobes extending radially inwardly to a location radially spaced from said axis by a first distance at a first axial location, and outer peripheral surface portions intermediate said lobes and radially spaced from said axis by a second distance at said first axial location, said second distance being greater than said first distance, such that said first peripheral surface portions do not extend over the full 360° of said center aperture; and a second aperture spaced radially outwardly of the center aperture, and a third aperture spaced by 180° about said central axis from said second aperture, said second and third apertures each being of a first dimension along an axis extending radially outwardly of said central axis, and a second dimension measured generally tangent to a radius from said center axis, the first dimension being greater than the second dimension.

* * * * *